(12) United States Patent
Mantena et al.

(10) Patent No.: US 7,487,472 B2
(45) Date of Patent: Feb. 3, 2009

(54) METHOD, SYSTEM AND PROGRAM PRODUCT FOR SYNCHRONOUS COMMUNICATION BETWEEN A PUBLIC ELECTRONIC ENVIRONMENT AND A PRIVATE ELECTRONIC ENVIRONMENT

(75) Inventors: Ravindra R. Mantena, Morrisville, NC (US); Christina L. Mattoon, Danbury, CT (US); Bijay Satpathy, Danbury, CT (US); Julie A. Wheeler-Cyran, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 1494 days.

(21) Appl. No.: 09/751,069

(22) Filed: Dec. 29, 2000

(65) Prior Publication Data

US 2002/0087879 A1 Jul. 4, 2002

(51) Int. Cl.
*H04L 9/00* (2006.01)
(52) U.S. Cl. .............................. 716/1; 726/15
(58) Field of Classification Search ..................... 726/1, 726/15
See application file for complete search history.

(56) References Cited

U.S. PATENT DOCUMENTS

| | | | |
|---|---|---|---|
| 6,286,028 B1 * | 9/2001 | Cohen et al. | 709/202 |
| 6,338,050 B1 | 1/2002 | Conklin et al. | 705/80 |
| 6,381,640 B1 | 4/2002 | Beck et al. | 709/223 |
| 6,418,448 B1 | 7/2002 | Sarkar | 707/104.1 |

OTHER PUBLICATIONS

Preston Gralla, How The Internet Works, Aug. 1999, Macmillian Computer Publishing, Millenium Edition, pp. 262-263.*
"Vetcentric.com Web-Enables Veterinary Supply Chain Using Neon Technology," Dialog File 613, Accession No. 00373116, PR Newswire, Jul. 13, 2000.
"MINOLTA-QMS Extends E-commerce Activities With Worldwide SAP Implementation," Dialog File 610, Accession No. 00298748, Business Wire, Jun. 12, 2000.
"Candle and AT&T Team up at SAPPHIRE Conference to Demonstrate Any-To-Any Application Integration For SAP R/3 Applications Via the Web or Lotus Notes," Dialog File 20, Accession No. 02821200, PR Newswire, Sep. 15, 1998.
Busse, Torsten, "Boeing takes off with Baan," Dialog File 256, Accession No. 00109318, InfoWorld, v20 n27 p. 65(2), Jul. 6, 1998.
Carter, et al., "Supplier Bar Codes: Closing The EDI Loop," National Association of Purchasing Management, Aug. 1991.

* cited by examiner

*Primary Examiner*—Jacob Lipman
(74) *Attorney, Agent, or Firm*—Derek S. Jennings; Heslin Rothenberg Farley & Mesiti P.C.; Wayne F. Reinke, Esq.

(57) ABSTRACT

Synchronous communications between a public electronic environment (e.g., a browser on a global computer network) and a private electronic environment (e.g., an ERP application on a private computer network) are facilitated by automatically routing a communication from the browser to the ERP application through messaging middleware, obtaining by the messaging middleware a reply from the ERP application in response to the communication while the browser and messaging middleware wait therefor, and automatically returning the reply from the ERP application to the browser. Encryption and firewalls are also used for security.

104 Claims, 1 Drawing Sheet

METHOD, SYSTEM AND PROGRAM PRODUCT FOR SYNCHRONOUS COMMUNICATION BETWEEN A PUBLIC ELECTRONIC ENVIRONMENT AND A PRIVATE ELECTRONIC ENVIRONMENT

CROSS REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

U.S. Patent Application Publication No. 2002-0087421, published on Jul. 4, 2002, by Mantena et al., entitled "Method, System and Program Product for Providing an Entitled Price in an Electronic Transaction";

U.S. Patent Application Publication No. 2002-0087422, published on Jul. 4, 2002, by Mantena et al., entitled "Method, System and Program Product for Providing an Electronic Order Confirmation in an Electronic Transaction", now abandoned; and U.S. Pat. No. 6,999,949, issued Feb. 14, 2006, by Mantena et al., entitled "Method, System and Program Product for Synchronous Communication Between a Public Electronic Environment and a Private Electronic Environment".

BACKGROUND OF THE INVENTION

1. Technical Field

The present invention generally relates to communications between public and private electronic environments. More particularly, the present invention relates to synchronous communications between a public electronic environment and a private electronic environment.

2. Background Information

The protection of sensitive electronic data has often resulted in that data being placed in a private electronic environment not accessible from a public electronic environment. For example, Enterprise Resource Planning (ERP) applications are large, expensive and complex computer programs that track massive volumes of commerce data (e.g., base prices, customers, contracts, tax conditions, etc.) and perform various functions for sellers of goods and services. Due to the sensitive nature of the types of information tracked by ERP applications, from both the buyer and seller perspective, the ERP applications have resided on private, secure computer networks, and have not been accessible from public computer networks.

However, with the increasing use of and dependence on public computer networks, such as, for example, the Internet, for everything from communications to electronic business transactions, the inaccessibility of ERP applications has posed problems. For example, organizations participating in electronic commerce have discovered that the inability to access ERP applications from public computer networks has made it very difficult (and generally impractical) to provide accurate, real time information in electronic transactions.

Where a merchant organization has had the resources, elaborate schemes have been used to make it seem to the customer that the information is provided effortlessly, when in fact much manual maneuvering is going on in the background. Where a merchant organization has not had the resources, it simply either has not provided some of the information it would like to provide to customers (and/or which customers are requesting), or has forced the customer to go outside the electronic transaction to obtain the information (e.g., call the merchant on the telephone). Under either scenario, it would be vastly more efficient to be able to communicate with ERP applications from outside the private computer networks on which they reside. In addition, extremely complex computer architectures have been theorized as necessary to accomplish secure communications with a back end ERP application.

Thus, a need exists for relatively simple, real time communications between public electronic environments and private electronic environments, while still addressing security concerns.

SUMMARY OF THE INVENTION

Briefly, the present invention satisfies the need for relatively simple, real time, secure communications between public electronic environments and private electronic environments by synchronous routing of the communications, along with strong encryption and other security measures.

In accordance with the above, it is an object of the present invention to provide synchronous communications between public and private electronic environments.

The present invention provides, in a first aspect, a method for synchronous communication between a public electronic environment and a private electronic environment. The method comprises automatically routing a communication from a user in the public electronic environment to the private electronic environment, obtaining a reply within the private electronic environment in response to the communication while the user waits therefor, and automatically returning the reply from the private electronic environment to the public electronic environment.

The present invention also provides, in second and third aspects, a system and a program product implementing the method of the first aspect.

These, and other objects, features and advantages of this invention will become apparent from the following detailed description of the various aspects of the invention taken in conjunction with the accompanying drawings.

DETAILED DESCRIPTION OF THE INVENTION

Figure 1:
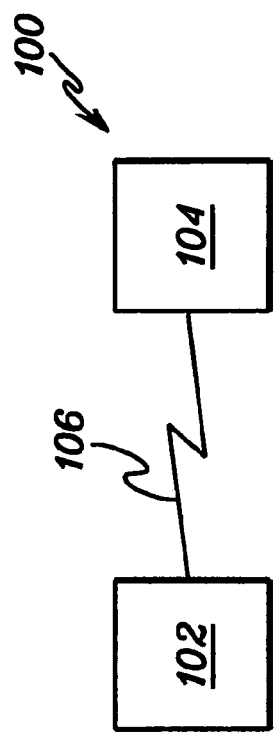
FIG. 1 is a simplified block diagram of a computing environment useful with the present invention.

One example of a computing environment useful with the present invention is described with reference to FIG. 1. A computing environment 100 includes, for instance, at least one computing unit 102 coupled to at least one other computing unit 104. In one example, computing unit 102 is a buyer's computer, while computing unit 104 is a server for an electronic merchant. Each unit includes, for example, one or more central processing units, memory, one or more storage devices and one or more input/output devices, as is well known in the art.

Computing unit 104 is, for example, an IBM system running AIX, a Unix derivative Operating System, and computing unit 102 is, for instance, a personal computer, such as a personal computer with Microsoft WINDOWS as the operating system, and based on the Intel PC architecture.

Computing unit 102 is coupled to computing unit 104 via a standard connection 106, such as any type of wire connection, token ring or network connection, to name just a few examples. One example of a communications protocol used by one or more of these connections is TCP/IP which allows connection to a computer network, such as, for example, a local area network or a global computer network (e.g., the INTERNET).

The INTERNET comprises a vast number of computers and computer networks that are interconnected through communication links. The interconnected computers exchange information using various services, such as electronic mail, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a user's computer system specifies the URL for that Web page in a request (e.g., a HyperText Transfer Protocol ("HTTP") request). The request can be, for example, directly input or performed through a hyperlink (or just "link") which is text or graphics that when pointed to and selected creates the request. The request is forwarded to the Web server that supports that Web page. When that Web server receives the request, it sends that Web page to the user's computer system. When the user's computer system receives that Web page, it typically displays the Web page using a browser. A browser is a special-purpose application program that effects the requesting of Web pages and the displaying of Web pages. A user's computer system may use a browser such as, for example, Microsoft INTERNET EXPLORER or Netscape NAVIGATOR.

Web pages are typically defined using HyperText Markup Language ("HTML"). HTML provides a standard set of tags that define how a Web page is to be displayed. When a user indicates to the browser to display a Web page, the browser sends a request to the server computer system to transfer to the user's computer system an HTML document that defines the Web page. When the requested HTML document is received by the user's computer system, the browser displays the Web page as defined by the HTML document. The HTML document contains various tags that control the displaying of text, graphics, controls, and other features. The HTML document may additionally contain URLs of other Web pages available on that server computer system or other server computer systems.

Figure 2:
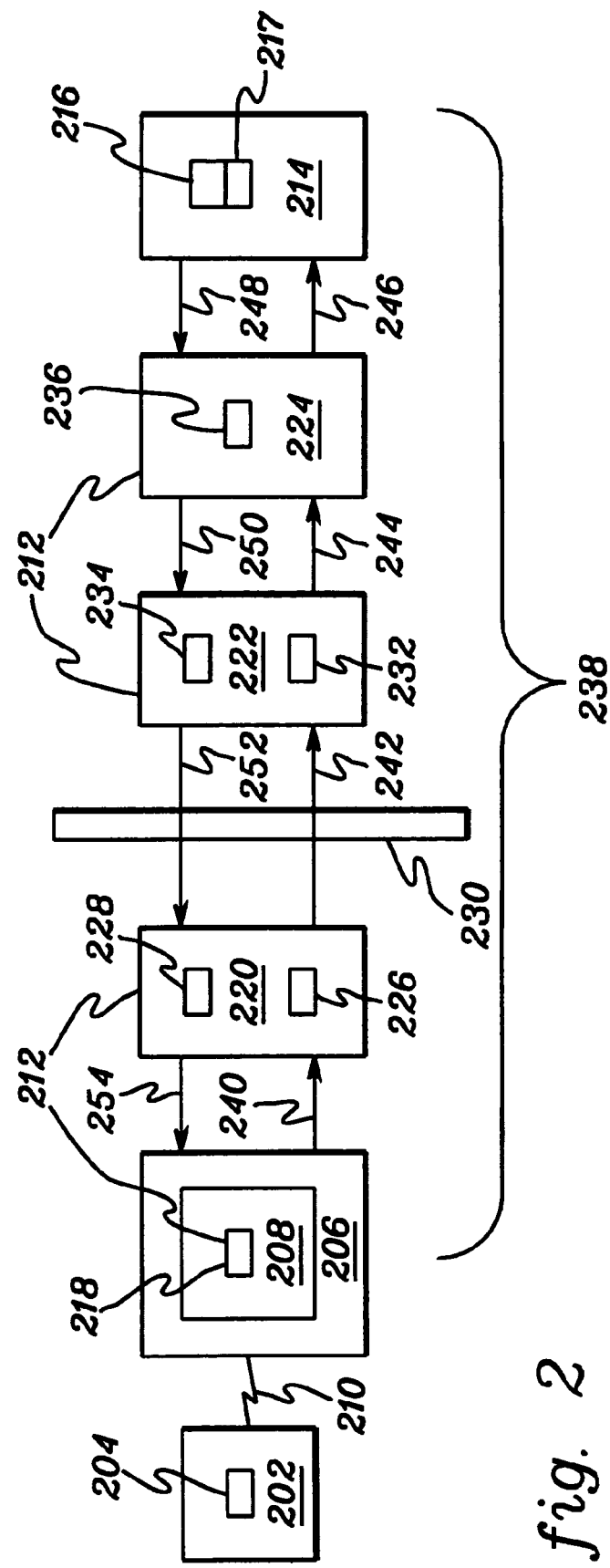
FIG. 2 is a block diagram of a system for synchronous communication between a public computer network and a private computer network.

FIG. 2 is a block diagram of one example of a system 200 for synchronous communication between a public electronic environment, e.g., a front end application on a global computer network and a private electronic environment, e.g., a back end ERP application on a private computer network. System 200 comprises computing unit 202 housing a browser 204 coupled to a server 206 for a commerce site 208 via a global computer network 210. System 200 further comprises messaging middleware 212 for communications between server 206 and computing unit 214 housing back end ERP application 216.

Messaging middleware 212 could be, for example, MSMQ from Microsoft in Redmond, Wash. However, the messaging middleware is preferably MQSERIES from IBM in Armonk, N.Y., since it runs on multiple different operating systems (e.g., MVS, VM, AIX, UNIX, Windows and more), whereas MSMQ runs only on the Microsoft Windows operating system. Further, the ERP application could be, for example, BAAN from the BAAN Company in The Netherlands, however, the ERP application is preferably SAP from SAP AG in Germany. Most preferably, the combination of MQSERIES and SAP is used.

The messaging middleware in this example is broken up into several components, including first messaging client 218, first messaging server 220, second messaging server 222 and second messaging client 224. First messaging client 218 is actually part of the programming for commerce site 208, and initiates communications from browser 204 to the messaging middleware. First messaging server 220 is a computing unit, and comprises a transmission queue 226 for outgoing communications with second messaging server 222 (also a computing unit), and a local queue 228 for incoming communications from second messaging server 222.

A firewall 230 separates the messaging servers. As one skilled in the art will know, a firewall physically comprises equipment and/or software for monitoring all incoming communications to messaging server 222 (and, in some scenarios, outgoing communications as well) for messages coming from predefined addresses, such as, for example, Internet Protocol (IP) addresses, and only allows messages from those addresses through. In addition, a firewall can monitor the type of incoming message (e.g., a request for a particular type of information). Second messaging server 222 comprises a holding queue 232 for holding incoming communications from messaging server 220, and a reply queue 234 for outgoing messages to messaging server 220. Second messaging client 224 comprises one or more modules 236 for issuing one or more commands to ERP application 216. In one scenario, the second messaging client is a separate computing unit, however, it could instead be part of the same computing unit such as, for example, messaging server 222 or even computing unit 214.

In the present example, the messaging middleware (except, technically, for messaging client 218), firewall and ERP application all reside on a private computer network 238 (e.g., a local area network) while browser 204 and server 206 are part of global computer network 210, which is a public computer network. Server 206 can be considered to sit on both networks, connected to browser 204 through the global computer network, and to the other elements of private network 238 via messaging client 218. One example of a communications protocol on private network 238 is TCP/IP.

A communication example between browser 204 and ERP application 216 will now be described. In this example, browser 204 initiates the communication by sending information and/or a request to commerce site 208 via global computer network 210. As one skilled in the art will understand, it is not the browser itself that is initiating the communication, but a user at computing unit 202 that is controlling the browser. The browser then waits for a reply to the communication to be returned from ERP application 216 by commerce site 208. Upon receipt of the communication by site 208 via server 206, messaging client 218 connects to messaging server 220 over standard connection 240. The connection remains open until the messaging client receives a reply. A connection is made, for example, via an application program interface (API), with messaging client 218 being preprogrammed with an IP address for messaging server 220. Once the connection is established, the messaging client then sends the communication to the messaging server along with an identification of second messaging server 222 and, preferably, a unique token identifier to track the message path. Preferably, the identification for second messaging server 222 is not the real IP address thereof, but something that can be correlated by first messaging server 220 into a real IP address. This masking of the real IP address is for security, since global computer network server 206 is exposed to a public computer network. Once the communication (and other items) is received by messaging server 220, it is placed in transmission queue 226. The transmission queue is not intended to hold a communication for any length of time, but simply acts as a temporary staging queue.

Once placed in transmission queue 226, the communication is immediately transmitted over an open channel 242 across firewall 230 to messaging server 222. Once received by messaging server 222, the communication and the token identifier are placed in holding queue 232. Open channel 242 is actually a standard connection monitored and controlled by software residing on messaging server 222.

When the communication and the token identifier are placed in holding queue 232, module 236 is, in some fashion, woken up. Where there are multiple different modules for different commands to the ERP application, messaging server 222 has therein defined all the various modules that could be called based on the communication received. Thus, messaging server 222 could determine which module to wake up, and where to contact the same. In another scenario, second messaging client 224 constantly monitors holding queue 232, and once something is placed therein, immediately retrieves the same. In either case, the communication and token identifier are passed from messaging server 222 to messaging client 224 via standard connection 244. Depending on the messaging middleware used, module 236 may need to reformat the information being passed to match a format required by the particular ERP application being used. The function of module 236 is, however, to issue a command to ERP application 216 over standard connection 246 to take some action, for example, to look up information or to perform a calculation. After issuing the command to the ERP application, messaging client 224, like the elements back to browser 204, waits for a reply to the communication from the ERP application.

It will be understood that the action taken by the ERP application is not part of the present invention. The invention simply requires that the reply be obtained, however, the way the reply is produced is not relevant. In actual implementation, it is the ERP application that performs the action, and that is how this example will describe the obtaining of the reply.

After the ERP application takes whatever action is indicated by the command from module 236, it returns a reply and the token identifier to messaging client 224 over standard connection 248. Upon receipt of the reply, messaging client 224 immediately transfers the reply and token identifier to messaging server 222 over standard connection 250. Messaging server 222, upon receipt of the information, immediately places it in reply queue 234. Reply queue 234 points to messaging server 220 and, since there is an open channel 252 between the messaging servers, the reply is immediately transferred from reply queue 234 to messaging server 220. Open channel 252 is, like open channel 242, a standard connection monitored and controlled by software residing on messaging server 220, and once something is placed in reply queue 234, it immediately transfers the contents thereof to messaging server 220. Messaging server 220 then places the reply in local queue 228. Once messaging client 218 detects that something has been placed in local queue 228, it retrieves the reply and token identifier over standard connection 254, and confirms that the token identifier received matches the one that was originally sent. At this point, commerce site 208 returns the reply to browser 204 for display thereby over global computer network 210.

Although system 200 was described with two messaging server/client pairs, it will be understood that more or less such pairs could be used, and that a given pair need not be on separate computing units. For example, there could be another messaging server/client pair within computing unit 214. Additional messaging server/client pairs provide increased security, which could further be enhanced with additional firewalls. Further, it will be understood that the connection pairs between elements on private computer network 238 could each actually be a single, standard two-way connection.

Security for system 200 is also preferably enhanced through the use of encryption at various stages. For example, communications between computing unit 202 and server 206 are preferably encrypted. One example of such encryption is 128-bit SSL (secure socket layer) encryption, which is routinely used on global computer networks. In such a case, for example, communications from computing unit 202 to server 206 are encrypted by browser 204, and decrypted by commerce site 208. Further, as the communication is received by messaging server 220 over connection 240, it is again encrypted. Examples of encryption algorithms that could be used include, for instance, DES and TRIPLE-DES available in various commercially available products from International Business Machines Corporation in Armonk, N.Y. Messaging server 222 then decrypts the communication via channel 242 upon receipt. When the reply is coming back from ERP application 216, it is encrypted as it leaves messaging server 222 and decrypted as it leaves messaging server 220. In this case, since connection 254 is not a channel, the decryption is actually done by messaging server 220. It will be understood that the above encryption scheme is merely one example of numerous encryption schemes that could be used.

The above-described computing environment and/or computing units are only offered as examples. The present invention can be incorporated and used with many types of computing units, computers, processors, nodes, systems, work stations and/or environments without departing from the spirit of the present invention. Additionally, while some of the embodiments described herein are discussed in relation to servers and clients, such embodiments are only examples. Other types of computing environments can benefit from the present invention and, thus, are considered a part of the present invention.

Additionally, in various aspects of the present invention, the client need not be remote from the server. Various aspects of the invention are equally applicable to clients and servers running on the same physical machine, different physical machines or any combinations thereof.

The present invention can include at least one program storage device readable by a machine, tangibly embodying at least one program of instructions executable by the machine to perform the capabilities of the present invention. The program storage device can be provided as a part of a computer system or provided separately.

The figures depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method for synchronous communication between a public electronic environment and a private electronic environment, comprising:
   automatically routing a communication from a user in the public electronic environment to the private electronic environment;
   causing a reply to the communication to be produced within the private electronic environment in real time; and
   automatically returning the reply from the private electronic environment to the public electronic environment;
   wherein the public electronic environment comprises a front end application, wherein the private electronic environment comprises a back end Enterprise Resource Planning (ERP) application, wherein the automatically routing comprises automatically routing the communication from the front end application to the back end ERP application, wherein the causing comprises causing the ERP application to produce the reply, and wherein the automatically returning comprises automatically returning the reply from the ERP application to the front end application for providing to the user; and
   wherein the automatically routing comprises routing the communication through messaging middleware, and wherein the causing comprises causing by the messaging middleware the ERP application to produce the reply while the front end application and the messaging middleware wait therefor.

2. The method of claim 1, wherein the front end application comprises a browser, wherein the messaging middleware comprises at least two messaging clients and at least one messaging server, and wherein the automatically routing comprises:
   sending the communication from the browser to a hosting server for a site on a global computer network, wherein one of the at least two messaging clients resides on the hosting server;
   forwarding the communication from the hosting server to the at least one messaging server;
   forwarding the communication from the at least one messaging server to another of the at least two messaging clients; and
   forwarding the communication from the another of the at least two messaging clients to the ERP application.

3. The method of claim 1, wherein the messaging middleware comprises MQSERIES and the ERP application comprises SAP.

4. The method of claim 1, wherein the messaging middleware comprises MQSERIES.

5. The method of claim 1, wherein the messaging middleware comprises MSMQ.

6. The method of claim 1, wherein the ERP application comprises SAP.

7. The method of claim 1, wherein the ERP application comprises BAAN.

8. The method of claim 1, wherein the causing further comprises causing by the messaging middleware a command to be issued to the ERP application to trigger production of the reply.

9. The method of claim 1, wherein the automatically returning comprises returning the reply from the ERP application to the front end application through the messaging middleware.

10. The method of claim 1, wherein the front end application comprises a browser.

11. The method of claim 10, wherein the automatically routing comprises:
    sending the communication from the browser to a hosting server for a site on a global computer network;
    forwarding the communication from the hosting server to the messaging middleware; and
    forwarding the communication from the messaging middleware to the ERP application.

12. The method of claim 11, wherein the sending comprises employing encryption for the communication.

13. The method of claim 12, wherein the employing comprises employing at least 128-bit Secure Socket Layer (SSL) encryption.

14. The method of claim 11, wherein the messaging middleware comprises a first messaging client on the hosting server, a first messaging server, a second messaging server, and a second messaging client, and wherein forwarding the communication from the hosting server to the messaging middleware comprises;
    forwarding the communication from the first messaging client to the first messaging server;
    forwarding the communication from the first messaging server to the second messaging server; and
    forwarding the communication from the second messaging server to the second messaging client.

15. The method of claim 14, wherein forwarding the communication from the first messaging client to the first messaging server comprises generating by the first messaging client the token identifier and forwarding a token identifier along with the communication, and wherein the automatically returning comprises returning the token identifier to the first messaging client for verification.

16. The method of claim 14, wherein forwarding the communication from the first messaging client to the first messaging server comprises encrypting the communication by the first messaging client.

17. The method of claim 16, wherein forwarding the communication from the second messaging server to the second messaging client comprises decrypting the communication by the second messaging server.

18. The method of claim 14, wherein forwarding the communication from the first messaging server to the second messaging server comprises forwarding the communication across a fire wall.

19. The method of claim 14, wherein the second messaging client comprises a module for issuing a command to the ERP application, wherein the causing comprises issuing the command from the second messaging client to the ERP application to trigger production of the reply, and wherein forwarding the communication from the messaging middleware to the ERP application comprises forwarding the communication from the second messaging client to the ERP application.

20. The method of claim 14, wherein forwarding the communication from the messaging middleware to the ERP application comprises forwarding the communication from the second messaging client to the ERP application, and wherein the automatically returning comprises:
    sending the reply from the ERP application to the second messaging client;
    forwarding the reply from the second messaging client to the second messaging server;
    forwarding the reply from the second messaging server to the first messaging server;
    forwarding the reply from the first messaging server to the first messaging client on the hosting server; and
    returning the reply from the hosting server to the browser for display.

21. The method of claim 20, wherein forwarding the reply from the second server to the first server comprises forwarding the reply though a fire wall.

22. The method of claim 20, wherein forwarding the reply from the second messaging client to the second server comprises encrypting the reply.

23. The method of claim 22, wherein forwarding the reply from the first server to the first messaging client on the hosting server comprises decrypting the reply.

24. The method of claim 20, wherein returning the reply from the hosting server to the browser for display thereby comprises employing encryption for the reply.

25. The method of claim 24, wherein the employing comprises employing at least 128-bit Secure Socket Layer (SSL) encryption.

26. The method of claim 11, wherein forwarding the communication from the hosting server to the messaging middleware and forwarding the communication from the messaging middleware to the ERP application comprise forwarding over a private network.

27. A system for synchronous communication between a public electronic environment and a private electronic environment, comprising:
   means for automatically routing a communication from a user in the public electronic environment to the private electronic environment;
   means for causing a reply to the communication to be produced within the private electronic environment in real time; and
   means for automatically returning the reply from the private electronic environment to the public electronic environment;
   wherein the public electronic environment comprises a front end application, wherein the private electronic environment comprises a back end Enterprise Resource Planning (ERP) application, wherein the means for automatically routing comprises means for automatically routing the communication from the front end application to the back end ERP application, wherein the means for causing comprises means for causing the ERP application to produce the reply, and wherein the means for automatically returning comprises means for automatically returning the reply from the ERP application to the front end application for providing to the user; and
   wherein the means for automatically routing comprises means for routing the communication through messaging middleware, and wherein the means for causing comprises means for causing by the messaging middleware the ERP application to produce the reply while the front end application and the messaging middleware wait therefor.

28. The system of claim 27, wherein the front end application comprises a browser, wherein the messaging middleware comprises at least two messaging clients and at least one messaging server, and wherein the means for automatically routing comprises:
   means for sending the communication from the browser to a hosting server for a site on a global computer network, wherein one of the at least two messaging clients resides on the hosting server;
   means for forwarding the communication from the hosting server to the at least one messaging server;
   means for forwarding the communication from the at least one messaging server to another of the at least two messaging clients; and
   means for forwarding the communication from the another of the at least two messaging clients to the ERP application.

29. The system of claim 27, wherein the messaging middleware comprises MQSERIES and the ERP application comprises SAP.

30. The system of claim 27, wherein the messaging middleware comprises MQSERIES.

31. The system of claim 27, wherein the messaging middleware comprises MSMQ.

32. The system of claim 27, wherein the ERP application comprises SAP.

33. The system of claim 27, wherein the ERP application comprises BAAN.

34. The system of claim 27, wherein the means for causing further comprises means for causing by the messaging middleware a command to be issued to the ERP application to trigger production of the reply.

35. The system of claim 27, wherein the means for automatically returning comprises means for returning the reply from the ERP application to the front end application through the messaging middleware.

36. The system of claim 27, wherein the front end application comprises a browser.

37. The system of claim 36, wherein the means for automatically routing comprises:
   means for sending the communication from the browser to a hosting server for a site on a global computer network;
   means for forwarding the communication from the hosting server to the messaging middleware; and
   means for forwarding the communication from the messaging middleware to the ERP application.

38. The system of claim 37, wherein the means for sending comprises means for employing encryption for the communication.

39. The system of claim 38, wherein the means for employing comprises means for employing at least 128-bit Secure Socket Layer (SSL) encryption.

40. The system of claim 37, wherein the messaging middleware comprises a first messaging client on the hosting server, a first messaging server, a second messaging server, and a second messaging client, and wherein means for forwarding the communication from the hosting server to the messaging middleware comprises:
   means for forwarding the communication from the first messaging client to the first messaging server;
   means for forwarding the communication from the first messaging server to the second messaging server; and
   means for forwarding the communication from the second messaging server to the second messaging client.

41. The system of claim 40, wherein means for forwarding the communication from the first messaging client to the first messaging server comprises means for generating by the first messaging client a token identifier and means for forwarding the token identifier along with the communication, and wherein the means for automatically returning comprises means for returning the token identifier to the first messaging client for verification.

42. The system of claim 40, wherein means for forwarding the communication from the first messaging client to the first messaging server comprises means for encrypting the communication by the first messaging client.

43. The system of claim 42, wherein means for forwarding the communication from the second messaging server to the second messaging client comprises means for decrypting the communication by the second messaging server.

44. The system of claim 40, wherein means for forwarding the communication from the first messaging server to the second messaging server comprises means for forwarding the communication across a fire wall.

45. The system of claim 40, wherein the second messaging client comprises a module for issuing a command to the ERP application, wherein the means for causing comprises issuing the command from the second messaging client to the ERP application to trigger production of the reply, and wherein means for forwarding the communication from the messaging middleware to the ERP application comprises means for forwarding the communication from the second messaging client to the ERP application.

46. The system of claim 40, wherein means for forwarding the communication from the messaging middleware to the ERP application comprises means for forwarding the communication from the second messaging client to the ERP application, and wherein the means for automatically returning comprises:

means for sending the reply from the BRP application to the second messaging client;
means for forwarding the reply from the second messaging client to the second messaging server;
means for forwarding the reply from the second messaging server to the first messaging server;
means for forwarding the reply from the first messaging server to the first messaging client on the hosting server; and
means for returning the reply from the hosting server to the browser for display.

47. The system of claim 46, wherein means for forwarding the reply from the second server to the first server comprises means for forwarding the reply through a fire wall.

48. The system of claim 46, wherein means for forwarding the reply from the second messaging client to the second server comprises means for encrypting the reply.

49. The system of claim 48, wherein means for forwarding the reply from the first server to the first messaging client on the hosting server comprises means for decrypting the reply.

50. The system of claim 46, wherein means for returning the reply from the hosting server to the browser for display thereby comprises means for employing encryption for the reply.

51. The system of claim 50, wherein the means for employing comprises means for employing at least 128-bit Secure Socket Layer (SSL) encryption.

52. The system of claim 37, wherein means for forwarding the communication from the hosting server to the messaging middleware and means for forwarding the communication from the messaging middleware to the ERP application comprise means for forwarding over a private network.

53. At least one program storage device readable by a machine, tangibly embodying at least one program of instructions executable by the machine to perform a method for synchronous communication between a public electronic environment and a private electronic environment, comprising:

automatically routing a communication from a user in the public electronic environment to the private electronic environment;
causing a reply to the communication to be produced within the private electronic environment in real time; and
automatically returning the reply from the private electronic environment to the public electronic environment;
wherein the public electronic environment comprises a front end application, wherein the private electronic environment comprises a back end Enterprise Resource Planning (ERP) application, wherein the automatically routing comprises automatically routing the communication from the front end application to the back end ERP application, wherein the causing comprises causing the ERP application to produce the reply, and wherein the automatically returning comprises automatically returning the reply from the ERP application to the front end application for providing to the user; and
wherein the automatically routing comprises routing the communication through messaging middleware, and wherein the causing comprises causing by the messaging middleware the ERP application to produce the reply while the front end application and the messaging middleware wait therefor.

54. The at least one program storage device of claim 53, wherein the front end application comprises a browser, wherein the messaging middleware comprises at least two messaging clients and at least one messaging server, and wherein the automatically routing comprises:

sending the communication from the browser to a hosting server for a site on a global computer network, wherein one of the at least two messaging clients resides on the hosting server;
forwarding the communication from the hosting server to the at least one messaging server;
forwarding the communication from the at least one messaging server to another of the at least two messaging clients; and
forwarding the communication from the another of the at least two messaging clients to the ERP application.

55. The at least one program storage device of claim 53, wherein the messaging middleware comprises MQSERIES and the ERP application comprises SAP.

56. The at least one program storage device of claim 53, wherein the messaging middleware comprises MQSERIES.

57. The at least one program storage device of claim 53, wherein the messaging middleware comprises MSMQ.

58. The at least one program storage device of claim 53, wherein the ERP application comprises SAP.

59. The at least one program storage device of claim 53, wherein the ERP application comprises BAAN.

60. The at least one program storage device of claim 53, wherein the causing further comprises causing by the messaging middleware a command to be issued to the ERP application to trigger production of the reply.

61. The at least one program storage device of claim 53, wherein the automatically returning comprises returning the reply from the ERP application to the front end application through the messaging middleware.

62. The at least one program storage device of claim 53, wherein the front end application comprises a browser.

63. The at least one program storage device of claim 62, wherein the automatically routing comprises:

sending the communication from the browser to a hosting server for a site on a global computer network;
forwarding the communication from the hosting server to the messaging middleware; and
forwarding the communication from the messaging middleware to the ERP application.

64. The at least one program storage device of claim 63, wherein the sending comprises employing encryption for the communication.

65. The at least one program storage device of claim 64, wherein the employing comprises employing at least 128-bit Secure Socket Layer (SSL) encryption.

66. The at least one program storage device of claim 63, wherein the messaging middleware comprises a first messaging client on the hosting server, a first messaging server, a second messaging server, and a second messaging client, and wherein forwarding the communication from the hosting server to the messaging middleware comprises:
 forwarding the communication from the first messaging client to the first messaging server;
 forwarding the communication from the first messaging server to the second messaging server; and
 forwarding the communication from the second messaging server to the second messaging client.

67. The at least one program storage device of claim 66, wherein forwarding the communication from the first messaging client to the first messaging server comprises generating by the first messaging client a token identifier and forwarding the token identifier along with the communication, and wherein the automatically returning comprises returning the token identifier to the first messaging client for verification.

68. The at least one program, storage device of claim 66, wherein forwarding the communication from the first messaging client to the first messaging server comprises encrypting the communication by the first messaging client.

69. The at least one program storage device of claim 68, wherein forwarding the communication from the second messaging server to the second messaging client comprises decrypting the communication by the second messaging server.

70. The at least one program storage device of claim 66, wherein forwarding the communication from the first messaging server to the second messaging server comprises forwarding the communication across a fire wall.

71. The at least one program storage device of claim 66, wherein the second messaging client comprises a module for issuing a command to the ERP application, wherein the causing comprises issuing the command from the second messaging client to the ERP application to trigger production of the reply, and wherein forwarding the communication from the messaging middleware to the ERP application comprises forwarding the communication from the second messaging client to the ERP application.

72. The at least one program storage device of claim 66, wherein forwarding the communication from the messaging middleware to the ERP application comprises forwarding the communication from the second messaging client to the ERP application, and wherein the automatically returning comprises:
 sending the reply from the ERP application to the second messaging client;
 forwarding the reply from the second messaging client to the second messaging server;
 forwarding the reply from the second messaging server to the first messaging server;
 forwarding the reply from the first messaging server to the first messaging client on the hosting server; and
 returning the reply from the hosting server to the browser for display.

73. The at least one program storage device of claim 72, wherein forwarding the reply from the second server to the first server comprises forwarding the reply through a fire wall.

74. The at least one program storage device of claim 72, wherein forwarding the reply from the second messaging client to the second server comprises encrypting the reply.

75. The at least one program storage device of claim 74, wherein forwarding the reply from the first server to the first messaging client on the hosting server comprises decrypting the reply.

76. The at least one program storage device of claim 72, wherein returning the reply from the hosting server to the browser for display thereby comprises employing encryption for the reply.

77. The at least one program storage device of claim 76, wherein the employing comprises employing at least 128-bit Secure Socket Layer (SSL) encryption.

78. The at least one program storage device of claim 63, wherein forwarding the communication from the hosting server to the messaging middleware and forwarding the communication from the messaging middleware to the ERP application comprise forwarding over a private network.

79. A method for providing a computing infrastructure, comprising:
 integrating computer-readable code into a computing system, wherein the computer-readable code in combination with the computing system is adapted to perform:
  automatically routing a communication from a user in a public electronic environment to a private electronic environment;
  causing a reply to the communication to be produced within the private electronic environment in real time; and
  automatically returning the reply from the private electronic environment to the public electronic environment;
  wherein the public electronic environment comprises a front end application, wherein the private electronic environment comprises a back end Enterprise Resource Planning (ERP) application, wherein the automatically routing comprises automatically routing the communication from the front end application to the back end ERP application, wherein the causing comprises causing the ERP application to produce the reply, and wherein the automatically returning comprises automatically returning the reply from the ERP application to the front end application for providing to the user; and
  wherein the automatically routing comprises routing the communication though messaging middleware, and wherein the causing comprises causing by the messaging middleware the ERP application to produce the reply while the front end application and the messaging middleware wait therefor.

80. The method of claim 79, wherein the front end application comprises a browser, wherein the messaging middleware comprises at least two messaging clients and at least one messaging server, and wherein the automatically routing comprises:
 sending the communication from the browser to a hosting server for a site on a global computer networks wherein one of the at least two messaging clients resides on the hosting server;
 forwarding the communication from the hosting server to the at least one messaging server;
 forwarding the communication from the at least one messaging server to another of the at least two messaging clients; and
 forwarding the communication from the another of the at least two messaging clients to the ERP application.

81. The method of claim 79, wherein the messaging middleware comprises MQSERIES and the ERP application comprises SAP.

82. The method of claim 79, wherein the messaging middleware comprises MQSERIES.

83. The method of claim 79, wherein the messaging middleware comprises MSMQ.

84. The method of claim 79, wherein the ERP application comprises SAP.

85. The method of claim 79, wherein the ERP application comprises BAAN.

86. The method of claim 79, wherein the causing further comprises causing by the messaging middleware a command to be issued to the ERP application to trigger production of the reply.

87. The method of claim 79, wherein the automatically returning comprises returning the reply from the ERP application to the front end application through the messaging middleware.

88. The method of claim 79, wherein the front end application comprises a browser.

89. The method of claim 88, wherein the automatically routing comprises:
    sending the communication from the browser to a hosting server for a site on a global computer network;
    forwarding the communication from the hosting server to the messaging middleware; and
    forwarding the communication horn the messaging middleware to the ERP application.

90. The method of claim 89, wherein the sending comprises employing encryption for the communication.

91. The method of claim 90, wherein the employing comprises employing at least 128-bit Secure Socket Layer (SSL) encryption.

92. The method of claim 89, wherein the messaging middleware comprises a first messaging client on the hosting server, a first messaging server, a second messaging server, and a second messaging client, and wherein forwarding the communication from the hosting server to the messaging middleware comprises:
    forwarding the communication from the first messaging client to the first messaging server;
    forwarding the communication from the first messaging server to the second messaging server; and
    forwarding the communication from the second messaging server to the second messaging client.

93. The method of claim 92, wherein forwarding the communication from the first messaging client to the first messaging server comprises generating by the first messaging client the token identifier and forwarding a token identifier along with the communication, and wherein the automatically returning comprises returning the token identifier to the first messaging client for verification.

94. The method of claim 92, wherein forwarding the communication from the first messaging client to the first messaging server comprises encrypting the communication by the first messaging client.

95. The method of claim 94, wherein forwarding the communication from the second messaging server to the second messaging client comprises decrypting the communication by the second messaging server.

96. The method of claim 92, wherein forwarding the communication from the first messaging server to the second messaging server comprises forwarding the communication across a fire wall.

97. The method of claim 92, wherein the second messaging client comprises a module for issuing a command to the ERP application, wherein the causing comprises issuing the command from the second messaging client to the ERP application to trigger production of the reply, and wherein forwarding the communication from the messaging middleware to the ERP application comprises forwarding the communication from the second messaging client to the ERP application.

98. The method of claim 92, wherein forwarding the communication from the messaging middleware to the ERP application comprises forwarding the communication from the second messaging client to the ERP application, and wherein the automatically returning comprises:
    sending the reply from the ERP application to the second messaging client;
    forwarding the reply from the second messaging client to the second messaging server;
    forwarding the reply from the second messaging server to the first messaging server;
    forwarding the reply from the first messaging server to the first messaging client on the hosting server; and
    returning the reply from the hosting server to the browser for display.

99. The method of claim 98, wherein forwarding the reply from the second server to the first server comprises forwarding the reply through a fire wall.

100. The method of claim 98, wherein forwarding the reply from the second messaging client to the second server comprises encrypting the reply.

101. The method of claim 100, wherein forwarding the reply from the first server to the first messaging client on the hosting server comprises decrypting the reply.

102. The method of claim 98, wherein returning the reply from the hosting server to the browser for display thereby comprises employing encryption for the reply.

103. The method of claim 102, wherein the employing comprises employing at least 128-bit Secure Socket Layer (SSL) encryption.

104. The method of claim 89, wherein forwarding the communication from the hosting server to the messaging middleware and forwarding the communication from the messaging middleware to the ERP application comprise forwarding over a private network.

* * * * *